United States Patent [19]

Prochazka et al.

[11] 4,119,689

[45] Oct. 10, 1978

[54] SINTERING OF SILICON NITRIDE USING Be ADDITIVE

[75] Inventors: Svante Prochazka, Ballston Lake; Charles D. Greskovich, Schenectady; Richard J. Charles, Schenectady; Robert A. Giddings, Schenectady, all of N.Y.

[73] Assignee: General Electric Company, Schenectady, N.Y.

[21] Appl. No.: 756,085

[22] Filed: Jan. 3, 1977

[51] Int. Cl.² .................... C04B 35/58; C04B 35/64
[52] U.S. Cl. ........................... 264/65; 106/55; 106/73.5
[58] Field of Search ............. 264/65; 106/73.5, 55; 423/344

[56] References Cited

U.S. PATENT DOCUMENTS

| 3,953,221 | 4/1976 | Lange | 106/73.5 |
|---|---|---|---|
| 3,992,497 | 11/1976 | Terwilliger et al. | 264/66 |
| 4,017,319 | 4/1977 | Greskovich et al. | 264/65 |

FOREIGN PATENT DOCUMENTS 970,639  9/1964  United Kingdom ............ 423/344

OTHER PUBLICATIONS

Mitomo; M., "Pressure Sintering of $Si_3N_4$," Journal of Materials Science 11(1976) 1103–1107.

*Primary Examiner*—Winston A. Douglas
*Assistant Examiner*—Mark Bell
*Attorney, Agent, or Firm*—Jane M. Binkowski; Joseph T. Cohen; Charles T. Watts

[57] ABSTRACT

A particulate dispersion of silicon nitride and beryllium additive is formed into a green body and sintered at a temperature ranging from about 1900° to about 2200° C in a sintering atmosphere of nitrogen at superatmospheric pressure producing a sintered body with a density ranging from about 80 to about 100%.

5 Claims, 1 Drawing Figure

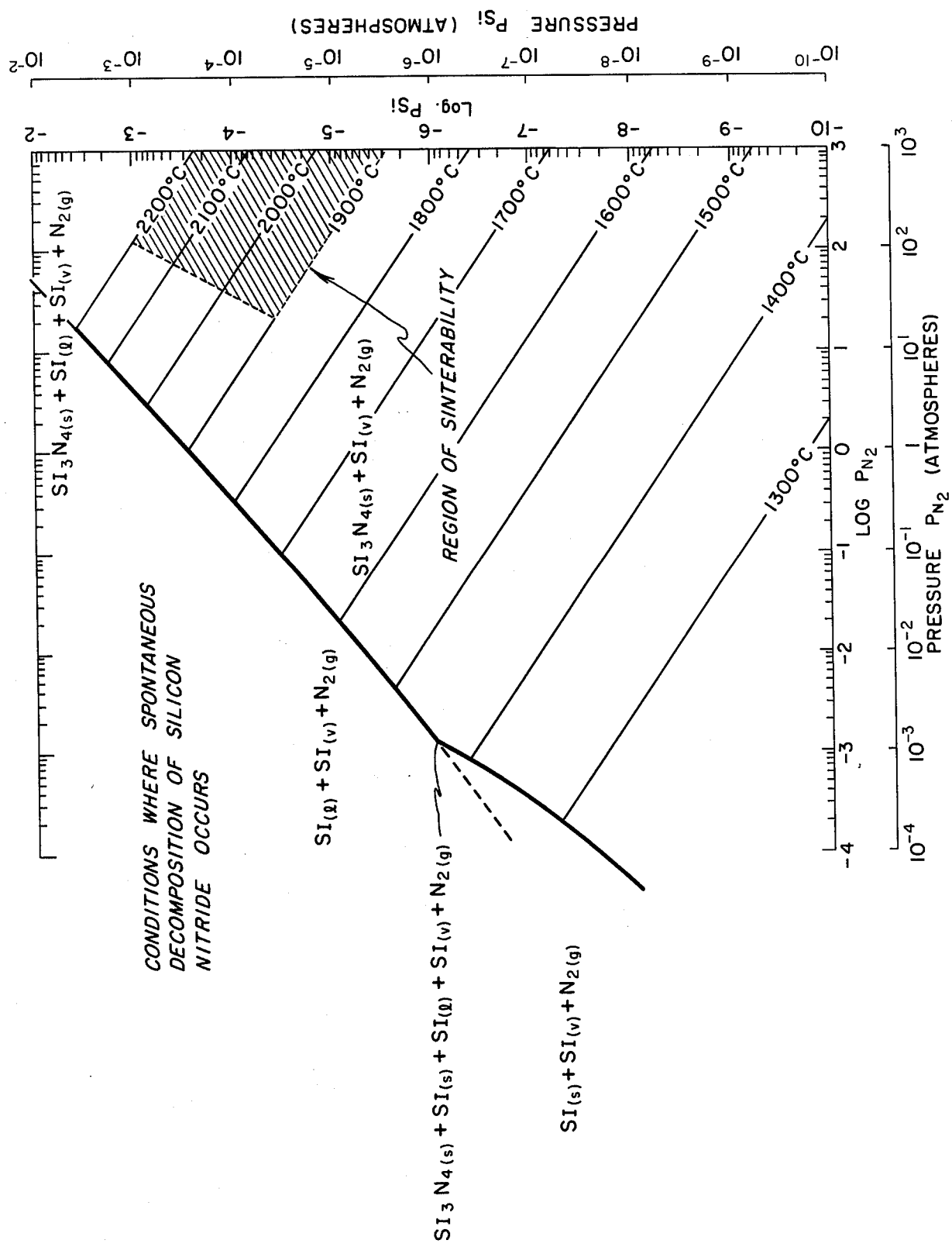

SINTERING OF SILICON NITRIDE USING BE ADDITIVE

The invention herein described was made in the course of or under a contract or subcontract thereunder (or grant) with the Department of the Air Force.

The present invention relates to a method of producing a pre-shaped polycrystalline silicon nitride sintered body having a density of at least about 80%.

Silicon nitride, the stoichiometric formulation for which is $Si_3N_4$, is a refractory electrical insulator with high strength, hardness, high resistance to thermal shock and consequently, has many potential high temperature applications. The characteristics which make it unique among other materials is the low thermal expansion coefficient combined with its refractoriness and oxidation stability. Silicon nitride has long been a prime material in the development of components for high temperature heat engines.

Silicon nitride parts are currently manufactured by either reaction bonding of silicon or hot-pressing. The first process has inherent limitations in achievable densities, and therefore strength, which exclude it from a number of typical applications. Consolidation by hot-pressing is achieved by using additions of oxides or nitrides of Mg, Be, Ca, Y, La, Ce, Zr to $Si_3N_4$ powders. The resulting ceramic is very strong but machining of complex components is very lengthy, difficult and frequently impossible or prohibitively expensive.

Sintering which would overcome the shaping problems has also been tried but with limited results since at temperatures approaching 1750° C. at atmospheric pressure silicon nitride decomposes rapidly. Silicon nitride with 90% density has been obtained by using an addition of 5% magnesia, by G. R. Terwilliger and F. F. Lange, "Pressureless Sintering of $Si_3N_4$," Journal of Materials Science 10(1975)1169, however, weight losses of up to 30% were observed and made the process impractical.

M. Mitomo, "Pressure Sintering of $Si_3N_4$," Journal of Materials Science 11(1976)1103-1107, discloses the sintering of $Si_3N_4$ with 5% MgO at 1450° to 1900° C. under a pressure of 10 atmospheres of nitrogen producing a maximum density of 95% of the theoretical value, that density and weight loss initially increased at the higher temperatures, that the density then decreased above a certain temperature because it was determined by two countervailing processes, shrinkage and thermal decomposition of silicon nitride and that his optimum temperature was ~ 1800° C.

It is known in the art that the high magnesium oxide additive necessary to induce sintering degrades oxidation resistance and high temperature mechanical properties of the silicon nitride product. The present invention does not use an oxide additive. Specifically, in contrast to sintering processes which use metal oxide additives such as magnesium oxide which do not decompose readily and which therefore retain substantially all of the oxygen introduced by the metal oxide additive, in the present sintering process oxygen is always lost from the sintering body in a significant amount. Also, in the present process, the sintering body undergoes no significant weight loss due to the thermal decomposition of the silicon nitride and this is indicated by the high densities of the resulting sintered product which can range from 80% to 100% of the theoretical density of silicon nitride. In addition, the present invention makes it possible to fabricate complex shaped articles of silicon nitride directly with little or no machining.

Those skilled in the art will gain a further and better understanding of the present invention from the detailed description set forth below, considered in conjunction with the FIGURE accompanying and forming a part of the specification which shows conditions where spontaneous decomposition of silicon nitride occurs, i.e. to the left of the heavy solid line, conditions where spontaneous decomposition of silicon nitride does not occur, i.e. to the right of the heavy solid line, and conditions necessary for producing the present sintered product, i.e. the shaded area referred to as the Region of Sinterability. Specifically, silicon nitride decomposes into silicon and nitrogen, and consequently, there is always a finite pressure of silicon vapor and nitrogen above a surface of silicon nitride. According to principles of chemical equilibrium, the higher the nitrogen pressure the lower the silicon vapor pressure and vice versa. The conditions shown to the right of the heavy solid line in the FIGURE are plots at a given temperature of the logarithm of the partial pressure of nitrogen and the logarithm of the corresponding partial pressure of silicon vapor. For convenience, a scale in atmospheres for the partial pressure of nitrogen as well as for the partial pressure of silicon vapor are given. At any conditions selected to the right of the heavy solid line in the FIGURE, spontaneous thermal decomposition of silicon nitride does not occur, but only the shaded area referred to as the Region of Sinterability sets forth temperature and corresponding pressure conditions which produce the present sintered product.

Briefly stated, the present process comprises forming a homogeneous dispersion having an average particle size which is submicron of silicon nitride and a beryllium additive, shaping the dispersion into a green body, and sintering the green body at a temperature ranging from about 1900° to about 2200° C. in a sintering atmosphere of nitrogen at a superatmospheric pressure of nitrogen which at the sintering temperature is sufficient to prevent significant thermal decomposition of the silicon nitride and which produces a sintered body with a density ranging from at least about 80 to about 100% of the theoretical density of silicon nitride.

By a significant thermal decomposition of silicon nitride herein it is meant significant weight loss of silicon nitride due to thermal decomposition of silicon nitride and such significant weight loss of silicon nitride would be higher than about 3% by weight of the total amount of silicon nitride in the green body. Usually, however, in the present invention, weight loss of silicon nitride due to thermal decomposition of silicon nitride is less than 1% by weight of the total amount of silicon nitride in the green body.

The silicon nitride powder used in the present process can be amorphous or crystalline or mixtures thereof. The crystalline silicon nitride powder can be α- or β-silicon nitride or mixtures thereof.

The present starting silicon nitride powder can range in purity from a totally pure silicon nitride powder to one of ceramic grade. The necessary purity of the silicon nitride powder used depends largely on the temperatures and loads at which the final sintered product will be used at with the highest temperatures of use generally requiring the most pure powders. Specifically, with increasingly pure powder the resulting sintered product increasingly retains its room temperature properties at high temperatures, i.e. the more stable are the properties of the sintered product with increasing temperatures.

The present silicon nitride powder may contain metallic and non-metallic impurities. Specifically, based on the total composition of the starting silicon nitride powder, its oxygen content may range up to about 5% by weight. A powder having an oxygen content in excess of about 5% by weight provides no advantage because it is likely to produce a sintered product with impaired high temperature mechanical properties. Normally the oxygen is present in the form of silica. The amount of excess elemental silicon which may be present in the powder is not critical, providing it is of submicron size, since during the sintering process elemental silicon is nitrided to form silicon nitride, and providing that the volume increase accompanying nitridation of the elemental silicon has no significant deleterious effect on the sintered product. Ordinarily, elemental silicon may be present in silicon nitride powder in amounts ranging up to about 4% by weight. Non-metallic impurities such as halogens which evaporate during sintering and which do not significantly deteriorate the properties of the sintered silicon nitride body may also be present frequently in amounts up to about 3% by weight of the starting silicon nitride powder.

Ceramic grade silicon nitride powder normally contains metallic impurities such as calcium, iron, and aluminum which tend to form in the sintered product intergranular low melting phases that have a significantly deleterious effect on the product's properties at elevated temperatures. In the present process, when ceramic grade silicon nitride powder is used, the total amount of such metallic impurities should not be higher than that typically found in such powders which is about 1% by weight of the starting powder. Specifically, when such metallic impurities are present in an amount of about 1% by weight, the resulting sintered product is usually dark grey in color and it is useful for applications at temperatures not higher than about 1300° C. and not requiring high load bearing capacity. With decreasing amounts of these metallic impurities, the mechanical properties of the resulting sintered product at elevated temperatures improve, particularly with elimination of calcium and iron.

To produce a sintered product which has significantly stable mechanical properties at high temperatures, the preferred starting silicon nitride powder has a low oxygen content, i.e. less than about 2% by weight of the powder and it is free or substantially free of metallic impurities which form intergranular low melting phases. Specifically, this preferred silicon nitride powder may contain metallic impurities such as calcium, iron and aluminum in total amount ranging up to about 0.1% by weight, and preferably no higher than about 0.05% by weight, of the starting silicon nitride powder. Such a powder produces a light tan, light grey or white sintered product. However, the most preferred silicon nitride powder of the present process for producing a sintered product with substantially stable, i.e., most stable, mechanical properties at high temperatures is also oxygen free or may contain oxygen in an amount ranging up to about 1% by weight of the powder. Sure a pure silicon nitride powder can be synthesized. Alternatively, to reduce its oxygen content and also remove its vaporizable impurities, the silicon nitride powder can be calcined at a temperature ranging from about 1400° to about 1500° C. in a vacuum or in an atmosphere which has no significant deteriorating effect on the powder such as helium, nitrogen, hydrogen and mixtures thereof.

Specifically, the preferred silicon nitride powders can produce in accordance with the present process a sintered product which retains its room temperature shape and mechanical properties at high temperatures making it particularly useful for high temperature structural applications such as gas turbine blades, i.e., they can produce a sintered product which undergoes no significant change in density or mechanical properties after substantial exposure to air at temperatures ranging up to about 1400° C. and after substantial exposure in an atmosphere in which it is substantially inert such as argon to temperatures above 1500° ranging up to about 1700° C.

The present preferred silicon nitride powder can be produced by a number of processes. For example, in one process $SiO_2$ is reduced with carbon in nitrogen below 1400° C. Still other processes react a silicon halide with ammonia or a nitrogen and hydrogen mixture to obtain either $Si_3N_4$ directly or via precursors such as $Si(NH)_2$ which are converted to $Si_3N_4$ by calcination yielding silicon nitride which usually contains oxygen and halogens at a 1 to 3% by weight level. The powder can also be sythesized in a plasma from silicon vapor and nitrogen.

Very pure silicon nitride powder can be formed by a process set forth in Ser. No. 756,241 filed of even date herewith in the name of Svante Prochazka and Charles D. Greskovich and assigned to the assignee hereof and which by reference is incorporated herein. Specifically, this copending application discloses reacting silane and an excess amount of ammonia above 600° C. and calcining the resulting solid at between 1100° to 1500° C. to obtain amorphous or crystalline silicon nitride.

In the present process the beryllium additive is selected from the group consisting of elemental beryllium, beryllium carbide, beryllium nitride, beryllium fluoride, beryllium silicon nitride and mixtures thereof. The known stoichiometric formulations for these additives are Be, $Be_2C$, $Be_3N_2$, $BeF_2$, and $BeSiN_2$, $Be_6Si_3N_8$, $Be_4SiN_4$, $Be_5Si_2N_6$, $Be_{11}Si_5N_{14}$, $Be_9Si_3N_{10}$. In the present process the beryllium additive is used in an amount so that its beryllium component is equivalent to from about 0.1% to about 2.0% by weight of elemental beryllium, and preferably from about 0.5% to about 1.0% by weight of elemental beryllium, based on the amount of silicon nitride. Amounts of the beryllium additive outside the range are not effective in producing the present sintered body with a density of at least about 80%.

In carrying out the process at least a significantly or substantially uniform or homogeneous particulate dispersion or mixture having an average particle size which is submicron of silicon nitride and beryllium additive is formed. Such a dispersion is necessary to produce a sintered product with significantly uniform properties and having a density of at least 80%. The silicon nitride and beryllium additive powders, themselves, may be of a particle size which breaks down to the desired size in forming the dispersion, but preferably the starting silicon nitride is submicron and the starting beryllium additive is less than 5 microns in particle size, and preferably submicron. Generally, the silicon nitride powder ranges in mean surface area from about 2 square meters per gram to about 50 square meters per gram which is equivalent to about 0.94 micron to 0.04 micron, respectively. Preferably, the silicon nitride powder ranges in mean surface area from about 5 square meters per gram to about 25 square meters per gram which is equivalent to about 0.38 micron to about 0.08 micron, respectively.

The silicon nitride and beryllium additive powders can be admixed by a number of techniques such as, for example, ball milling or jet milling, to produce a significant or substantially uniform or homogeneous dispersion or mixture. The more uniform the dispersion, the more uniform is the microstructure, and therefore, the properties of the resulting sintered body.

Representative of these mixing techniques is ball milling, preferably with balls of a material such as tungsten carbide or silicon nitride which has low wear and which has no significant detrimental effect on the properties desired in the final product. If desired, such milling can also be used to reduce particle size, and to distribute any impurities which may be present substantially uniformly throughout the powder. Preferably, milling is carried out in a liquid mixing medium which is inert to the ingredients. Typical liquid mixing mediums include hydrocarbons such as benzene and chlorinated hydrocarbons. Milling time varies widely and depends largely on the amount and particle size of the powder and type of milling equipment. In general, milling time ranges from about 1 hour to about 100 hours. The resulting wet milled material can be dried by a number of conventional techniques to remove the liquid medium. Preferably, it is dried in a vacuum oven maintained just above the boiling point of the liquid mixing medium.

A number of techniques can be used to shape the powder mixture, i.e., particulate dispersion, into a green body. For example, the powder mixture can be extruded, injection molded, die-pressed, isostatically pressed or slip cast to produce the green body of desired shape. Any lubricants, binders or similar materials used in shaping the dispersion should have no significant deteriorating effect on the green body or the resulting sintered body. Such materials are preferably of the type which evaporate on heating at relatively low temperatures, preferably below 200° C., leaving no significant residue. The green body should have a density of at least about 35%, and preferably at least about 45% or higher, to promote densification during sintering and achieve attainment of the desired density of at least 80% and higher.

In the present process, the sintering atmosphere of nitrogen can be stagnant, but preferably it is a flowing atmosphere and need only be sufficiently flowing to remove gaseous products which may be present, normally as a result of contaminants. Generally, the specific flow rate of nitrogen gas depends on the size of the furnace loading and somewhat on sintering temperature. The nitrogen gas used should be free of oxygen or substantially free of oxygen so that there is no significantly oxygen pickup by the sintering body.

Sintering of the green body is carried out at a temperature ranging from about 1900° to about 2200° C. in a sintering atmosphere of nitrogen at superatmospheric pressure which at the sintering temperature prevents thermal decomposition of the silicon nitride and also promotes shrinkage, i.e. densification, of the green body producing a sintered body with a density of at least 80% of the theoretical density of silicon nitride. Sintering temperatures lower than about 1900° C. are not effective for producing the present sintered product whereas temperatures higher than 2200° C. would require nitrogen pressures too high to be practical. Preferably, the sintering temperature ranges from about 2050° to 2150° C.

The effect of increased nitrogen pressure on the sintering of silicon nitride can be best described by considering the effect of nitrogen pressure on the thermal decomposition

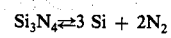

i.e. silicon nitride decomposes into silicon and nitrogen, and consequently there is always a finite pressure of silicon vapor and nitrogen above a surface of silicon nitride. According to principles of chemical equilibrium, the higher the nitrogen pressure the lower the silicon vapor pressure and vice versa. This may be expressed in quantitative terms by $$P_{Si}^3 \times P_{N_2}^2 = K_{(T)}$$

where $P_{Si}$ is partial pressure of silicon vapor, $P_{N_2}$ partial pressure of nitrogen and $K$ is the equilibrium constant which is calculated from available published thermodynamical data and refers to a specific temperature. Specifically, the published thermodynamical data relied on herein is disclosed in Still et al, JANAF Thermochemical Tables, second Ed., U.S. Dept. of Commerce, Nat. Stand. Ref. Data Ser. - Nat. Bur. Stand.(U.S.), 37, U.S. Government Printing Office, Washington, (June 1971). These thermodynamic relationships were calculated and are shown in the accompanying FIGURE where the logarithm of partial pressure of silicon vapor and partial pressure of nitrogen were plotted along with temperature scales and the coexisting phases shown.

From the FIGURE it can be seen that if nitrogen pressure above $Si_3N_4$ decreases at a given temperature, silicon vapor pressure increases until the saturated pressure of silicon vapor at the temperature applied is reached. At this and at lower nitrogen pressures silicon nitride will spontaneously decompose into silicon metal (liquid or solid) and nitrogen. In the FIGURE, the heavy solid line, from lower left to upper right delineates the set of conditions where silicon nitride, condensed silicon, silicon vapor and nitrogen gas coexist, i.e. conditions where spontaneous decomposition of silicon nitride occurs. Specifically, at any conditions selected to the left of the heavy solid line determined by nitrogen pressure and temperature, spontaneous decomposition of $Si_3N_4$ excludes sintering. At any conditions selected to the right of the heavy solid line, spontaneous thermal decomposition of silicon nitride does not occur. However, according to the present invention, only the shaded area in the FIGURE referred to as the Region of Sinterability sets forth temperature and corresponding pressure conditions which prevent thermal decomposition or significant thermal decomposition of the silicon nitride and also produce the present sintered product having a density of at least 80%. Specifically, the FIGURE illustrates that at every sintering temperature in the Region of Sinterability, a particular minimum pressure of nitrogen has to be applied and maintained which is substantially higher than the minimum pressure of nitrogen necessary to prevent spontaneous silicon nitride decomposition. The minimum sintering pressure of nitrogen is one which at a particular sintering temperature prevents thermal decomposition or signficant thermal decomposition of the silicon nitride and also promotes densification, i.e. shrinkage, of the body to produce a sintered product with a density of at least 80%.

Generally, at a given sintering temperature in the Region of Sinterability, an increase in nitrogen pressure will show an increase in the density of the sintered product, i.e., higher nitrogen pressures should produce higher density products. Likewise, at a given nitrogen pressure in the Region of Sinterability, the higher the sintering temperature, the higher should be the density of the resulting sintered product.

The shaded area referred to as the Region of Sinterability in the accompanying FIGURE shows that the particular minimum pressure of nitrogen used in the present process depends on sintering temperature and ranges from about 20 atmospheres at 1900° C. to about 130 atmospheres at a temperature of 2200° C. Specifically, the FIGURE shows that in accordance with the present process the minimum required pressure of nitrogen at 2000° C. is about 40 atmospheres, and at 2100° C. it is about 75 atmospheres. In the present process pressures of nitrogen higher than the required minimum pressure at a particular sintering temperature are useful to additionally densify the body to produce a sintered body having a density higher than 80%. The preferred maximum pressure of nitrogen is one which produces a sintered body of the highest density at the particular sintering temperature and such preferred maximum nitrogen pressure is determinable empirically. Nitrogen pressures higher than the preferred maximum pressure are useful but such pressures cause no significant additional densification of the body.

The present sintered product is comprised of silicon nitride and some form of beryllium. It may also contain oxygen in some form in an amount less than about 5% by weight of the sintered product since during sintering some oxygen is always lost. Preferably, for high temperatures applications, the sintered product contains oxygen in an amount less than about 2% by weight of the sintered product. For best results, and in its preferred form, the present sintered product is substantially free of oxygen or may contain oxygen in some form in an amount less than about 1% by weight of the sintered product.

The silicon nitride in the present product ranges from the $\beta$-form to a mixture of the $\beta$- and $\alpha$-forms wherein the $\beta$-form of silicon nitride is present in an amount of at least about 80% by weight of the total amount of silicon nitride. Preferably, the present product is comprised of only the $\beta$-form of silicon nitride since it provides the most stable properties.

Since during sintering a portion of the beryllium component of the additive evaporates, the sintered product contains beryllium in some form in an amount which is always less than about 2.0% by weight of the silicon nitride. The amount of the beryllium component which evaporates depends largely on sintering temperature and pressure, i.e. the higher the temperature and the lower the pressure the more beryllium is likely to evaporate. Usually, the amount of beryllium which evaporates during sintering is significant. Specifically, the present product will contain beryllium in some form in an amount ranging from less than about 0.1% by weight to less than about 2% by weight of the silicon nitride. The beryllium component of the sintered product is detectable or determinable by techniques such as emission spectroscopy and chemical analysis. Specifically, the minimum amount of beryllium present in the present product is that amount detectable by emission spectroscopy.

The sintered body or product of the present invention has a density ranging from about 80 to about 100% of the theoretical density of silicon nitride. With reference to the sintered body or product of the present invention by the term single phase or primary phase it is meant herein the silicon nitride phase, i.e. the $\alpha$-form or $\beta$-form of silicon nitride and mixtures thereof. X-ray diffraction analysis of the sintered product shows that with lower amounts of the beryllium additive, it is a single phase material, but that with higher amounts of the beryllium, traces of a secondary phase may be detectable. Generally, when the beryllium additive is used in amounts wherein its beryllium component is equivalent to levels up to about 1% by weight of elemental beryllium, the sintered product is usually a single phase material. However, when the beryllium additive is used in amounts wherein its beryllium component is equivalent to levels approaching or at about 2% by weight of elemental beryllium, a secondary beryllium-containing phase may be detected in the resulting sintered product. The secondary phase or phases are discrete and distributed significantly or substantially uniformly throughout the sintered body. Generally, the grains of the secondary phase or phases are of about the same size or finer than the grains of the primary phase.

When a preferred silicon nitride powder is used, i.e. a non-cermaic grade powder, i.e. a powder not prepared by nitridation of silicon, containing oxygen in an amount less less than about 2% by weight of the starting powder, usually the secondary phase is beryllium silicon nitride. Depending on the particular amount of beryllium present, the secondary phase or phases detectable in the resulting sintered product may range in total amount from a trace amount which is just detectable by X-ray diffraction analysis, i.e. about 2% by volume of the sintered body, up to about 5% by volume of the sintered body.

When a ceramic grade silicon nitride powder is used, the metallic impurities therein may also form a secondary phase in the sintered product. For example, such a powder may contain metallic impurities such as calcium, iron and aluminum in total amount no higher than about 1% by weight, and oxygen in some form ranging up to about 5% by weight of the starting silicon nitride powder. The amount of secondary phase or phases formed in the sintered product in this instance depends largely on the amounts of metallic impurities and oxygen, as well as the amount of beryllium present. Specifically, the secondary phase or phases may range up to about 10% by volume of the sintered body, but it may or may not be detected by X-ray diffraction analysis depending on the particular secondary phase formed. Due to the particular impurities present in ceramic grade powder, the secondary phase may be a glassy phase and not detectable by X-ray diffraction analysis. The extent and distribution of glassy phase present is very difficult to determine, and it is usually done by selective etching of the specimen and observing the pits formed by the etched out glassy phase. However, it is estimated that from the maximum amounts of metallic impurities, oxygen and beryllium which may be present herein, the secondary phase or phases produced may range, in total amount, up to about 10% by volume of the sintered body.

Also, in the present sintering process a significant amount of oxygen is lost, usually in the form of silicon monoxide. Therefore, the maximum amount of oxygen which can be present in the present sintered product is significantly less than 5% by weight of the product.

The present sintered product has a microstructure which is largely temperature dependent. The microstructure may range from an equiaxed type composed of uniform, fine-sized equiaxed or substantially equiaxed grains which may be of the β-form or a mixture of the β- and α-forms of silicon nitride, to an elongated type which is composed of nonuniform, elongated, needle-like grains of the β-form of silicon nitride. This range in microstructure includes microstructures of all ratios or combinations of the equiaxed and elongated types.

The lower sintering temperature of about 1900° C. produces a product with a fine-grained microstructure with uniform or substantially uniform grains which normally range from equiaxed to only slightly elongated and usually are less than about 2 microns in size. However, at a sintering temperature of about 2000° C., elongated needle-like grains of the β-form of silicon nitride appear in the still fine-equiaxed-grain uniform microstructure. Specifically, a sintering temperature of about 2000° C. produces a product with a microstructure with elongated grains, typically 1 to 2 microns thick and 3 to 10 microns in length, distributed in a fine-grained matrix typically with grains 1 to 2 microns thick. At sintering temperatures higher than 2000° C., the elongated β-grains increase in number per unit volume. Usually, these elongated grains have an aspect ratio ranging from about 5 to about 10 but occasionally these elongated grains may range in length up to about 30 microns or longer. Subjecting or annealing the present product to a temperature of about 2000° C. or higher at the present required nitrogen pressure for such temperature for a sufficient period of time converts the entire or at least substantially the entire microstructure to the nonuniform elongated β-form. Such annealing can be carried out in a matter of hours, depending on the size of the product and the particular annealing temperature used. Preferably, such annealing can be carried out by combining the sintering and annealing in a single step, but if desired, the annealing can be carried out as a separate step. The elongated needle-like grains of the β-form of silicon nitride are desirable because they increase the fracture toughness of the product making it less brittle as long as they are not grown to a length greater than about 75 microns.

The present sintered body having a density of 90% or higher is usually one wherein most of or all of the residual pores are closed, i.e. non-interconnecting, and such a sintered body is preferred since it is impervious and highly resistant to internal oxidation at elevated temperatures. Also, the higher the density of the sintered product, the better are its mechanical properties.

The present invention makes it possible to fabricate complex shaped polycrystalline silicon nitride ceramic articles directly. Specifically, the present sintered product can be produced in the form of a useful complex shaped article without machining such as an impervious crucible, a thin walled tube, a long rod, a spherical body, or a hollow shaped article. The dimensions of the present sintered product differ from those of its green body by the extent of shrinkage, i.e. densification, which occurs during sintering. Also, the surface quality of the sintered body depend on those of the green body from which it is formed, i.e. it has a substantially smooth surface if the green body from which it is formed has a smooth surface.

In the present invention, unless otherwise stated, the density of the sintered body as well as that of the green body is given as a fractional density of the theoretical density of silicon nitride (3.18/cc.)

The invention is further illustrated by the following example wherein the procedure was as follows unless otherwise stated:

Surface area measurements were made by a low temperature nitrogen absorption technique.

Sintering was carried out in an impervious closed end silicon carbide tube, 1.2 cm. in diameter, i.e. a silicon carbide tube open at one end only.

Temperature was measured by an optical pyrometer at the closed end of the silicon carbide tube, corrected for furnace window absorption and a mirror.

At the end of each sintering run, the power was switched off and the sintered silicon nitride bodies were furnace cooled to room temperature in the nitrogen atmosphere which was slowly depressurized to atmospheric pressure.

Liquid nitrogen labeled as "High Purity Dry Nitrogen" having less than 10 parts per million oxygen content was used as the source of nitrogen gas for the furnace atmosphere, i.e. the sintering atmosphere.

The bulk density of each pressing or green body was determined from its weight and dimensions.

Density of the sintered product was determined by water displacement using Archimedes method.

Shrinkage given in Table I is linear shrinkage $\Delta L/L_o(\%)$, and it is the difference in length between the green body and the sintered body, $\Delta L$, divided by the length of the green body $L_o$. This shrinkage is an indication of the extent of densification.

% Weight loss is the difference in weight between the green and sintered bodies divided by the weight of the green body.

EXAMPLE 1

For all the runs tabulated in Table I all formulation, mixing and drying was carried out in nitrogen under dry-box conditions. Also, in all of the runs the only additive used was beryllium nitride powder which was admixed with the silicon nitride powder in an amount of 2% by weight of silicon nitride powder which corresponds to 1.0% by weight of elemental beryllium. In addition, in all of the tabulated runs the green bodies were of substantially the same size.

For Run Nos. 1 to 5 of Table I in-house silicon nitride powder was used which was prepared as disclosed in copending Ser. No. 756,241 filed of even date herewith. Specifically, this powder was prepared in a furnace which included an open-ended fused silica reaction tube 3.8 cm. diameter placed in a tube furnace, i.e. except for its open-end portions the reaction tube was located inside the furnace, and connected on the downstream end to a coaxial electrostatic separator operated between 5 and 15 KV and 0.2 to 0.5 mA. The outlet of the separator was terminated with a bubbler filled with an organic solvent which ensured positive pressure in the system. A liquid manometer indicated gas pressure in the reaction tube. For each run the reaction tube was heated at a length of 15 inches to a maximum temperature of 850° C., the system purged with purified argon and the reactants were then metered in. Electronic grade silane and anhydrous ammonia dried further by passing the gas through a column of calcium nitride were metered in separately by coaxial inlets into the reaction tube. The gas flow rates were adjusted to 0.2 standard cubic feet per hour (SCFPH) of $SiH_4$ and 3.5 SCFPH of $NH_3$. A voluminous, light tan powder was collected in the downstream end of the reaction tube and in the attached electrostatic separator. After 4 hours the gas flow of reactants was discontinued and the system was left to cool off to room temperature under a flow of 0.5 SCFPH of purified argon. The powder was recovered from the reactor and separator and was calcined by heating it in a mullite crucible in a flowing gas mixture of 3 parts by volume nitrogen/11 parts by volume hydrogen at about 1450° C. for 30 minutes. The product was a light tan powder, amorphous to X-rays, had wide absorption bands in its I.R. spectra centered around 10.5 and 21.0 microns (characteristic for silicon-nitrogen bonding), and contained no metals above 50 ppm determined by emission spectroscopy. The oxygen content of a batch of powder prepared and calcined in the same manner was determined by neutron activation analysis to be 2.0% by weight of the powder.

For Run No. 6 a silicon nitride powder was used which was prepared by reacting silicon tetrachloride and ammonia. The powder was calcined by heating it in a mullite crucible the flowing gas mixture of 3 parts by volume nitrogen and 11 parts by volume hydrogen at 1450° C. for 30 minutes. The powder had an oxygen content below 5.0% by weight of the powder.

For Run Nos. 7 and 8 a purchased silicon nitride powder was used which was indicated to be 95% by weight α and 5.0% by weight β-silicon nitride. This powder was indicated by the manufacturer to be 99.97% pure, except for oxygen, that it contained molybdenum in an amount of about 0.01% by weight and also oxygen in an amount of 1.0% by weight of the powder.

In Run Nos. 9 to 11 a purchased silicon nitride powder indicated to be 80% by weight α- and 20% β-silicon nitride was used. This powder was indicated by the manufacturer to have been prepared by nitridation of silicon and that it contained the following impurities in weight % as follows: Ca<0.1%, Mg<0.1%, Fe<0.4%, Al<0.20%, and oxygen ~1.5%. In addition, this powder was found to contain unreacted elemental silicon in an amount of about 7 weight %.

In Run Nos. 1 to 5 the silicon nitride powder was admixed with the beryllium nitride powder and a sufficient amount of 1% solution of paraffin in benzene to form a slurry. The mixture was milled with ¼ inch silicon nitride grinding media at room temperature. After about 6 hours the resulting slurry was strained and dried from the solvent again under dry-box conditions. The resulting homogeneous submicron powder mixture was die-pressed into green bodies, i.e. ⅜ inch × ⅜ inch cylinders which were stored in a dessicator above $Ca_3N_2$. One of these pressings, i.e. green bodies, was used for Run No. 1 of Table I.

The Run No. 1 pressing was placed in the silicon carbide sintering tube which was in turn placed within a carbon resistance tube furnace except for its open end which was fitted with a pressure head. The pressing was placed so that it was positioned in the hot zone, i.e. the closed end portion of the sintering tube. The sintering tube was evacuated and then brought up to 800° C. At this point the pumping was discontinued and the sintering tube was pressurized to 72 atmospheres of nitrogen. The sintering tube was then brought up to the sintering temperature of 1990° C. in about 20 minutes, and held at 1990° C. for 15 minutes. At the end of this time, it was furnace cooled to room temperature and the resulting sintered body was evaluated. The results are shown in Table I.

The procedure used in Run Nos. 2 to 5 was substantially the same as that for Run No. 1 except as indicated in Table I.

In Runs 7 and 8 a portion of the silicon nitride powder was admixed with the beryllium nitride and a sufficient amount of a 1% solution of paraffin in benzene in a mortar and pestle to form a substantially uniform slurry. The slurry was strained and dried from the solvent. The resulting powder mixture, which was significantly homogeneous and had an average particle size that was submicron, was pressed into cylinders of substantially the same size and stored in a dessicator above calcium nitride.

The procedure used for Run No. 6 was substantially the same as that for Run No. 7 except that the green body formed by die pressing was then isostatically pressed at a pressure of 120,000 psi.

For Run Nos. 9 to 11 all formulation, mixing and drying was carried out substantially in the same manner as disclosed for Run No. 1 except that the mixture was milled with the silicon nitride grinding media for about 16 hours. The resulting homogeneous submicron powder mixture was die-pressed into green bodies, i.e. ⅜ inch × ⅜ inch cylinders, which were stored in a dessicator above calcium nitride.

The green bodies of Run Nos. 2 to 11 were sintered in the same manner as disclosed for Run No. 1 except as indicated in Table I.

TABLE I

| Run No. | Sintering Powder | Surface Area $m^2/g$ | Additive (Wt. %) | Approx. Green Density(%) | Sintering Conditions Temp. °C | Time (Min.) | Pressure (Atmos.) | Shrinkage % | Weight Loss % | Sintered Density g/cc | % |
|---|---|---|---|---|---|---|---|---|---|---|---|
| 1 | In-House (Calcined at 1470° C) | 10.2 | 2% $Be_3N_2$ | 47 | 1990 | 15 | 72 | 13.7 | 5.6 | 2.35 | 73.9 |
| 2 | " | " | " | " | 2050 | 15 | 75 | 15.3 | 6.0 | 2.43 | 76.0 |
| 3 | " | " | " | " | 2090 | 15 | 75 | 16.8 | 6.4 | 2.53 | 79.4 |
| 4 | " | " | " | " | 2150 | 15 | 95 | 19.0 | 6.1 | 2.67 | 83.9 |
| 5 | " | " | " | ≈55 | 2150 | 12 | 82 | — | — | 2.96 | 93.0 |
| 6 | In-House (Calcined at 1450° C) | 60 | " | ≈34 | 2050 | 15 | 72 | 28.8 | 5.8 | 2.94 | 92.5 |
| 7 | Purchased | 4.3 | " | 46 | 1990 | 15 | 75 | — | — | 2.70 | 84.5 |
| 8 | " | " | " | " | 2050 | 15 | 72 | — | — | 3.04 | 95.5 |
| 9 | Purchased (Ceramic Grade) | 2.6 | " | 61 | 1990 | 15 | 72 | — | — | 2.3 | 72 |
| 10 | " | " | " | " | 2040 | 15 | 72 | — | — | 2.61 | 81.8 |
| 11 | " | " | " | " | 2070 | 15 | 72 | — | — | 2.70 | 84.5 |

In Table I the sintered products of Run Nos. 1 to 5 and 6 were light grey in color, the products of Runs 7 and 8 were light grey to grey in color and the products of Runs 9 to 11 were grey to dark grey in color.

Table I shows the effectiveness of the beryllium additive where Run Nos. 4 to 8 and 10 to 11 illustrate the present invention. These runs show the substantial shrinkage or densification which takes place during sintering resulting in the present highly dense sintered products. These products were hard and strong.

X-ray diffraction analysis of the sintered product of Run No. 5 showed it to be comprised of β-silicon nitride with a trace amount of $BeSiN_2$ of less than 2%. The analysis also showed lines which were not identifiable and these lines would indicate a trace amount of some unknown compound believed to be some polytype of beryllium silicon nitride.

The sintered product of Run No. 5 was sectioned, polished, etched and a photomicrograph (magnified 550 X) was taken thereof. The photomicrograph showed it to be composed of very uniform equiaxed and slightly elongated grains up to about 5 microns and had an average grain size of about 2 microns.

The sintered product of Run No. 8 was also sectioned, polished and etched and a photomicrograph (magnified 550 X) was taken thereof. The photomicrograph showed elongated grains up to about 25 microns in length distributed in a fine-grained matrix composed of small substantially equiaxed grains of the order of 3 microns.

Table I also indicates that weight loss is about constant for a certain batch of powder and therefore it relates, more likely, to the chemistry of the powder than to the sintering conditions. This is illustrated by Run Nos. 1-4 which were prepared from the same batch of silicon nitride powder and which showed substantially the same weight loss. Specifically, it is believed that the weight loss in Table I reflects the sum of five or six components: evaporation of paraffin used as binder (about 3%), loss of weight due to oxygen removal in the form of SiO (about 2%), loss of weight due to release of ammonia from the amorphous silicon nitride powder, weight loss due to thermal decomposition of $Si_3N_4$ during sintering, weight loss due to loss of beryllium and weight gain due to nitridation of free silicon present in the starting powder compact, i.e. the green body. As a result, weight loss due to thermal decomposition of silicon nitride most likely is less than 0.3% by weight of the total amount of silicon nitride present.

EXAMPLE 2

This example shows that beryllium is lost in the present sintering process.

A green body was prepared in the same manner as disclosed for Run No. 1 of Example 1 except that 1% by weight of $Be_3N_2$ was used along with 2% by weight $Mg_3N_2$, which corresponds to 0.5% by weight of elemental beryllium and 1.5% by weight of elemental magnesium, based on the amount of silicon nitride.

The green body had a green density of 46%. It was sintered in the same manner as disclosed for Run No. 1 of Example 1 except that a sintering temperature of 1950° C. and a nitrogen sintering pressure of 85 atmospheres were used and sintering time was 20 minutes.

The sintering product was analyzed by emission spectroscopy and was found to contain 0.1% by weight magnesium and 0.3% by weight beryllium based on the amount of silicon nitride. This indicates that there is a significant loss of beryllium under the conditions of the present sintering process.

EXAMPLE 3

This example also shows that beryllium is lost in the present sintering process.

A green body was prepared in the same manner as disclosed for Run No. 7 of Example 1 except that 1% by weight of $Be_3N_2$ was used along with 2% by weight $Mg_3N_2$, which corresponds to 0.5% by weight of elemental beryllium and 1.5% by weight of elemental magnesium based on the amount of silicon nitride.

The green body had a green density of 46%. It was sintered in the same manner as disclosed for Run No. 7 except a sintering temperature of 2040° C. was used, a sintering pressure of 75 atmospheres was used for a period of time of 15 minutes.

The sintered product was analyzed by emission spectroscopy and was found to contain 0.1% by weight magnesium and 0.2% by weight beryllium based on the amount of silicon nitride. This indicates that there is a significant loss of beryllium in the present sintering process.

EXAMPLE 4

This example illustrates one technique of determining weight loss due to thermal decomposition of silicon nitride.

A reaction bonded silicon nitride cylinder, about ½ inch in length and about ¼ inch in diameter, prepared by the nitridation of a highly pure silicon sintered body was used. The cylinder had a density of about 70% of the theoretical density of silicon nitride and was porous with interconnecting pores.

The cylinder was weighed and subjected to conditions which were substantially the same as the sintering conditions set forth in Example 1 except that it was maintained at a temperature 1800° C. under a pressure of nitrogen of 80 atmospheres for a period of one hour. It was weighed again and then re-heated to a temperature of 2000° C. and kept at 2000° C. under a pressure of 80 atmospheres for 1 hour. It was then weighed again.

The total weight loss was found to be less than 0.5% by weight of the product indicating that silicon nitride did not undergo significant thermal decomposition under these conditions.

All of the following cited applications are, by reference, made part of the disclosure of the present application and assigned to the assignee hereof:

In copending U.S. patent application Ser. No. 756,086 entitled "Sintering Of Silicon Nitride Using Mg And Be Additives," filed of even date herewith in the names of Svante Prochazka, Charles D. Greskovich, Richard J. Charles and Robert A. Giddings, the disclosed process comprises forming a particulate dispersion of silicon nitride, magnesium additive and beryllium additive into a green body and sintering the green body at a temperature ranging from about 1800° C. to about 2200° C. in a sintering atmosphere of nitrogen at superatmospheric pressure producing a sintered body with a density ranging from about 80 to about 100%.

In copending U.S. patent application Ser. No. 756,084 entitled "Hot Pressing Of Silicon Nitride Using Beryllium Additive," filed of even date herewith in the names of Charles D. Greskovich, Svante Prochazka and Chester R. O'Clair, there is disclosed a dense polycrystalline silicon nitride body produced by hot-pressing a particulate mixture of silicon nitride and a beryllium additive.

In copending U.S. patent application Ser. No. 756,083 entitled "Hot Pressing Of Silicon Nitride Using Magnesium Silicide," filed of even date herewith in the names of Charles D. Greskovich and Chester R. O'Clair, there is disclosed a dense polycrystalline silicon nitride body produced by hot-pressing a particulate mixture of silicon nitride and a magnesium silicide additive.

What is claimed is:

1. A method of producing a pre-shaped polycrystalline body which consists essentially of providing at least a significantly homogeneous dispersion having an average particle size which is submicron of silicon nitride and a beryllium additive, said beryllium additive being selected from the group consisting of beryllium, beryllium carbide, beryllium fluoride, beryllium nitride, beryllium silicon nitride and mixtures thereof, said beryllium additive being used in an amount wherein the beryllium component is equivalent to from about 0.1% by weight to about 2% by weight of elemental beryllium based on the amount of silicon nitride, shaping said dispersion into a green body and sintering said green body at a temperature ranging from about 1900° C. to about 2200° C. in a sintering atmosphere of nitrogen, said nitrogen being at a superatmospheric pressure which at said sintering temperatures prevents significant thermal decomposition of said silicon nitride and produces a sintered body with a density of at least about 80% of the theoretical density of silicon nitride, the minimum pressure of said nitrogen ranging from about 20 atmospheres at a sintering temperature of 1900° C. to a minimum pressure of about 130 atmospheres at a sintering temperature of 2200° C.

2. A method according to claim 1 wherein said sintering temperature is about 2000° C. and said minimum pressure of nitrogen is about 40 atmospheres.

3. A method according to claim 1 wherein said sintering temperature is about 2100° C. and said minimum pressure of nitrogen is about 75 atmospheres.

4. A method according to claim 1 wherein said beryllium additive is beryllium nitride.

5. A method according to claim 1 wherein said beryllium additive is used in an amount wherein the beryllium component is equivalent to from about 0.25% by weight to about 1% by weight of elemental beryllium based on the amount of silicon nitride.

* * * * *